US00RE37210E

(19) United States
(12) Reissued Patent
Chuang

(10) Patent Number: US RE37,210 E
(45) Date of Reissued Patent: Jun. 12, 2001

(54) TOOL COMBINATION FOR BICYCLE

(76) Inventor: Louis Chuang, 7th-8, No. 20, Da Long Road, Taichung (TW)

(21) Appl. No.: 09/288,175

(22) Filed: Apr. 8, 1999

Related U.S. Patent Documents

Reissue of:
(64) Patent No.: 5,711,042
Issued: Jan. 27, 1998
Appl. No.: 08/689,027
Filed: Jul. 30, 1996

(51) Int. Cl.[7] ..... B25F 1/02
(52) U.S. Cl. ..... 7/138; 7/118; 81/440; 157/1.3
(58) Field of Search ..... 7/100, 118, 138, 7/165; 59/7; 81/437, 439, 440; 157/1.3

(56) References Cited

U.S. PATENT DOCUMENTS

| | | | | |
|---|---|---|---|---|
| 1,556,788 | * | 10/1925 | Hallvarson | 7/118 X |
| 2,173,042 | | 9/1939 | Picard . | |
| 2,798,290 | * | 7/1957 | Bassett | 7/118 X |
| 2,804,970 | * | 9/1957 | Kuc et al. | 81/440 X |
| 2,828,855 | | 4/1958 | Mosch . | |
| 4,759,645 | | 7/1988 | Kuo . | |
| 4,836,066 | | 6/1989 | Graham et al. . | |
| 4,854,045 | * | 8/1989 | Schaub | 7/118 X |
| 4,908,947 | | 3/1990 | Schaub . | |
| 4,967,435 | | 11/1990 | Seals . | |
| 5,303,439 | * | 4/1994 | Seals | 7/138 |
| 5,313,860 | * | 5/1994 | Liou | 7/138 X |
| 5,320,004 | | 6/1994 | Hsiao . | |
| 5,385,071 | | 1/1995 | Her . | |
| 5,632,056 | * | 5/1997 | Hsiao | 7/138 |
| 5,655,242 | * | 8/1997 | Chuang | 7/138 |
| 5,791,211 | * | 8/1998 | Bondhus et al. | 81/440 |

FOREIGN PATENT DOCUMENTS

| | | |
|---|---|---|
| 9318002 U | 11/1993 | (DE) . |
| 0191913 | 11/1985 | (EP) . |

* cited by examiner

*Primary Examiner*—James G. Smith
(74) *Attorney, Agent, or Firm*—Alan D. Kamrath, Esq.; Oppenheimer Wolff & Donnelly LLP

(57) ABSTRACT

A tool combination includes two tool assemblies that may be secured together by an engagement between a dovetail slot and a dovetail. The tool assemblies each includes a number of rotatable tools. One of the tool assemblies includes a rib formed on one side. The other tool assembly includes a knob pivotally engaged in a housing. The knob includes a projection for engaging with the rib. A spring may bias the projection of the knob to engage with the rib so as to secure the tool assemblies together. The tool assemblies each includes a spanner for engaging with and for repairing bicycle tire.

22 Claims, 6 Drawing Sheets

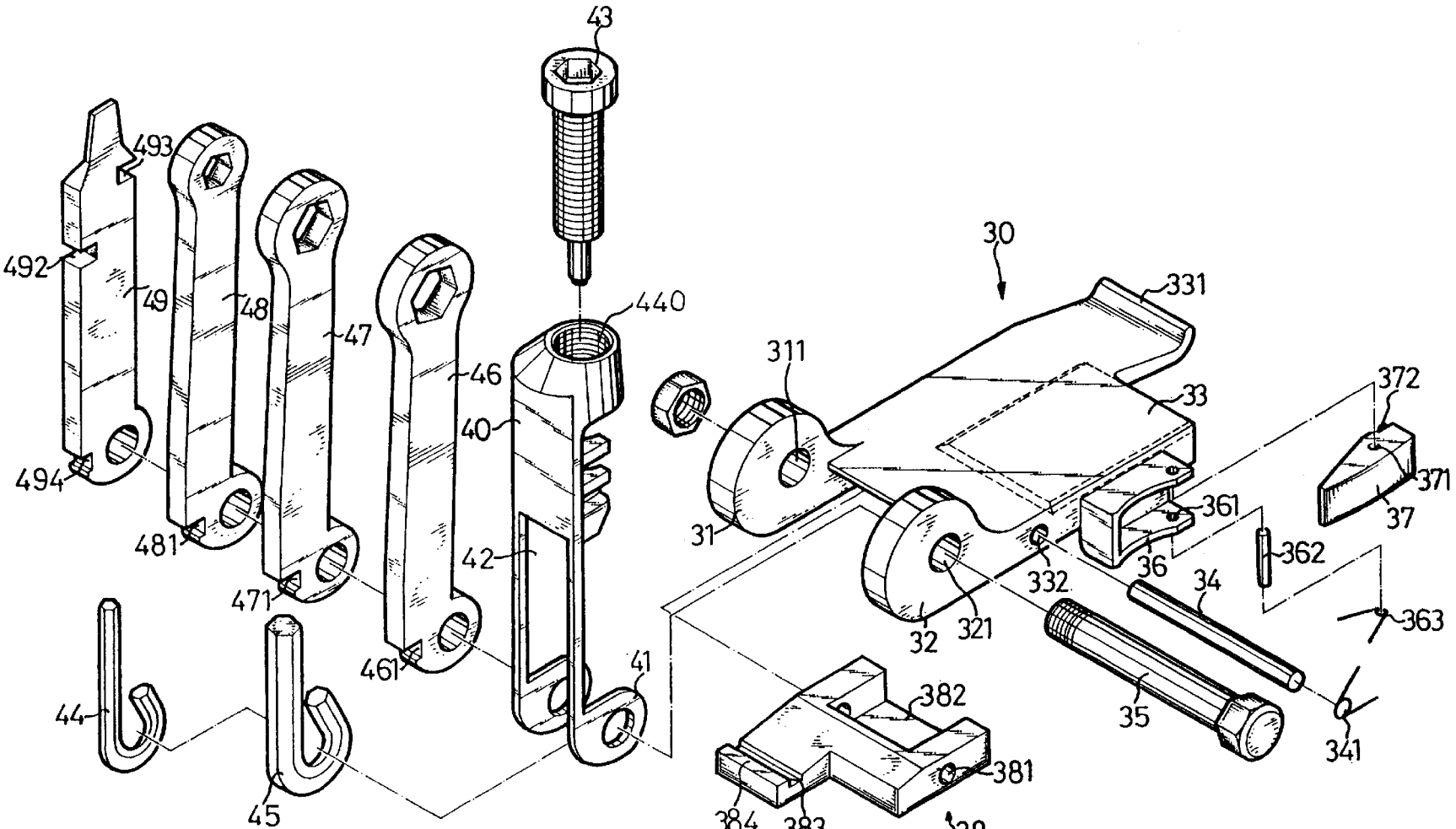
Fig. 2 Amended

TOOL COMBINATION FOR BICYCLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a tool, and more particularly to a tool combination for [bicycle] *bicycles*.

2. Description of the Prior Art

Typical bicycles comprise a number of elements and parts that are required to be fixed and repaired by a number of tools. The user [have] *has* to prepare a number of tools for engaging and disengaging the fastening members and for repairing the chains. It is inconvenient to prepare and to retain the tools in place.

The present invention has arisen to mitigate and/or obviate the afore-described disadvantages of [the] conventional tools for bicycles.

SUMMARY OF THE INVENTION

The primary objective of the present invention is to provide a tool combination which includes all of the required tools for fixing and repairing the bicycle.

In accordance with one aspect of the invention, there is provided a tool combination comprising a first tool assembly including a body having a dovetail slot formed therein and having a first bolt secured therein, at least one first tool rotatably engaged on the first bolt, a second tool assembly including a block having a dovetail formed thereon for engaging with the dovetail slot of the first tool assembly so as to secure the first tool assembly and the second tool assembly together, the block including a second bolt secured therein, at least one second tool rotatably engaged on the second bolt, and means for securing the first tool assembly and the second tool assembly together.

[THe] *The* body includes a pair of ears formed thereon, the ears each includes a hole formed therein for engaging with the first bolt, a first of the ears includes a socket formed thereon.

The body includes a cap formed thereon and having a rib formed in the cap, the block includes a housing formed thereon, the securing means includes a knob pivotally engaged in the housing, the knob includes a projection formed thereon for engaging with the rib of the cap, the securing means includes a biasing means for biasing the projection of the knob to engage with the rib so as to secure the body to the block.

The body and the block each includes a spanner for engaging with and for repairing *a* bicycle tire.

The second [tool] *tools* each includes a cavity formed therein, the second tool assembly includes a pole secured therein, a catch includes a middle portion pivotally coupled to the pole and rotatable about the pole, the catch includes a flange formed thereon for engaging with the cavity of the second tool so as to position the second tool, the catch includes a biasing means for biasing the flange to engage with the cavity.

A chain repairing tool is rotatably engaged on the second bolt, the chain repairing tool includes a notch formed therein, and at least one third tool is engaged in the notch of the chain repairing tool and rotatably engaged on the second bolt.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is an exploded [views] *view* illustrating the other tool assembly of the tool combination in accordance with the present invention;

DETAILED DESCRIPTION OF THE PREFERRED EMBODIMENT

Figure 1:
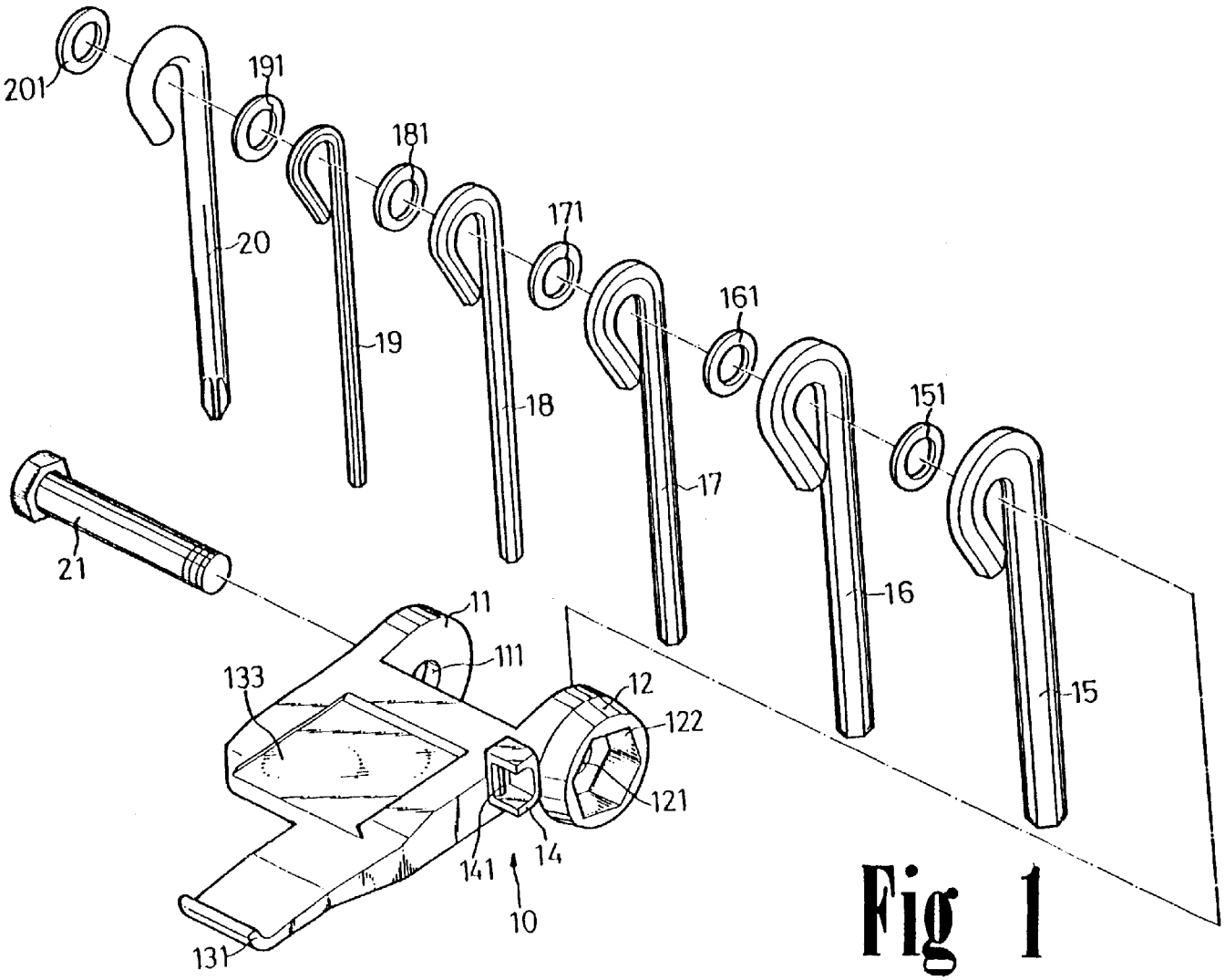
FIG. 1 is an exploded [views] *view* illustrating a tool assembly of a tool combination in accordance with the present invention.
Figure 3:
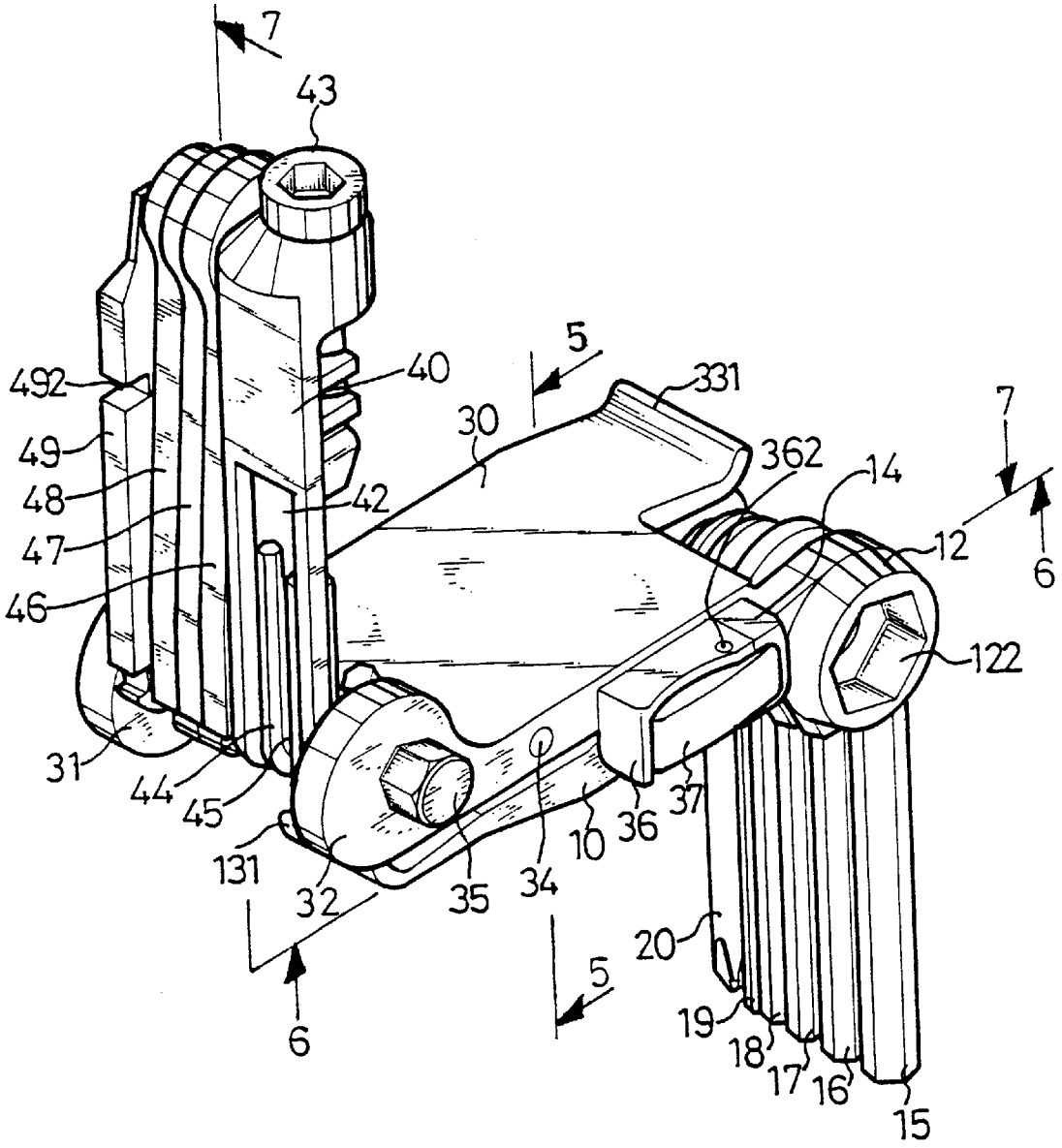
FIG. 3 is a perspective view of the tool combination.
Figure 4:
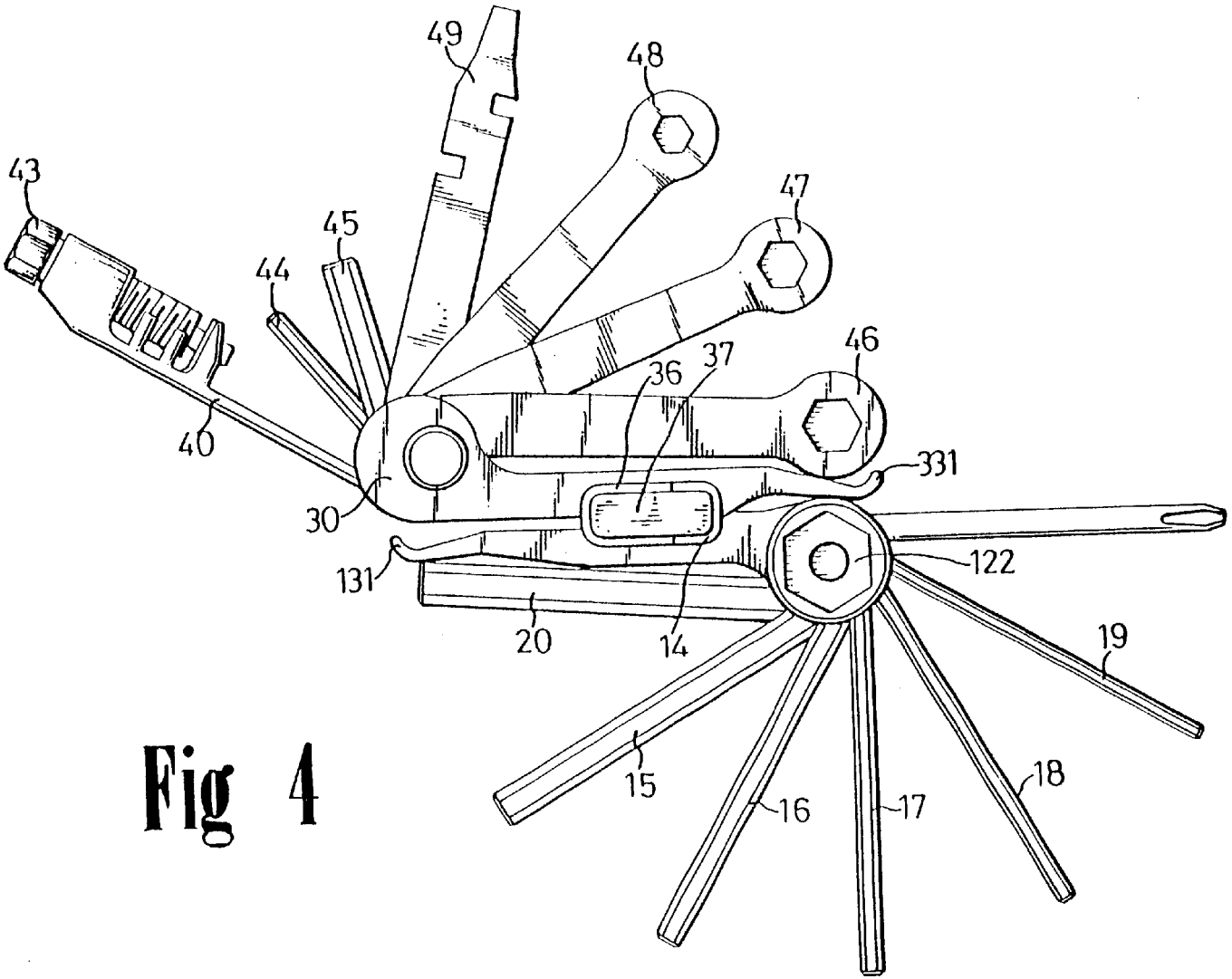
FIG. 4 is a [plane] *plan* view of the tool combination.

Referring to the drawings, and initially to FIGS. 1 to 4, a tool combination in accordance with the present invention comprises a first tool assembly as shown in FIG. 1, and a second tool assembly as shown in FIG. 2. The first tool assembly and the second tool assembly each includes a number of tools provided therein which are good enough for fixing and repairing all of the elements and parts of the bicycle. The first tool assembly and the second tool assembly [includes] *include* a securing device for securing the tool assemblies together such that the tool combination can be easily stored and carried.

Figure 6:
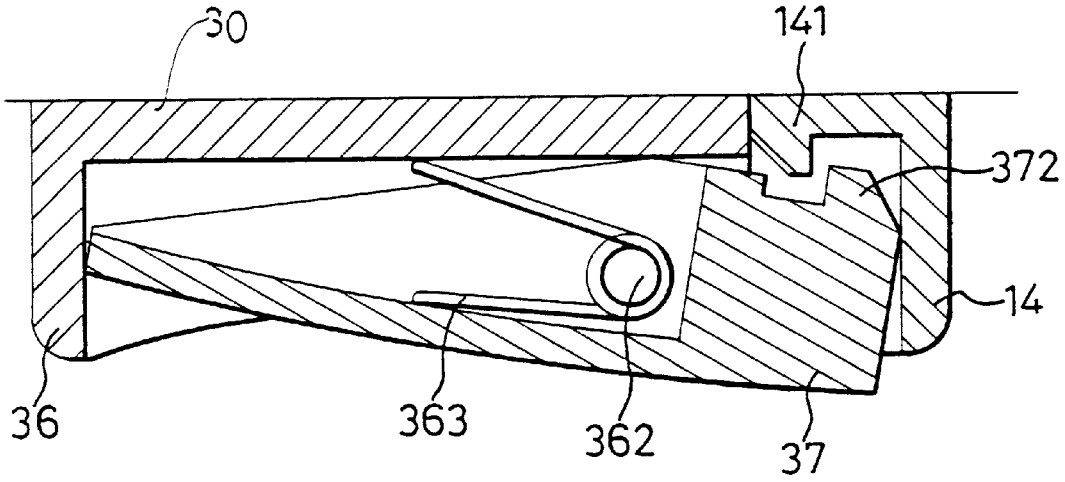
FIG. 6 is a cross sectional view taken along lines 6—6 of FIG. 3.

As shown in FIG. 1, the first tool assembly includes a body 10 having a pair of ears 11, 12 extended therefrom. The ears 11, 12 each includes a hole 111, 121 formed therein for engaging with a bolt 21. The ear 12 includes a socket 122 for engaging with screws, bolts or nuts. The body 10 includes a dovetail slot 133 formed therein and includes a spanner 131 for engaging with the bicycle tire and for repairing the bicycle tire. The body 10 includes a cap 14 formed on one side portion and having a rib 141 (FIGS. 1 and 6) formed therein. A number of screw drivers 15, 16, 17, 18, 19, 20 include one end rotatably engaged on the bolt 21 so as to form the first tool assembly. A number of washers 151, 161, 171, 181, 191, 201 are engaged on the bolt 21 and engaged between the screw drivers 15, 16, 17, 18, 19, 20 respectively.

Figure 5:
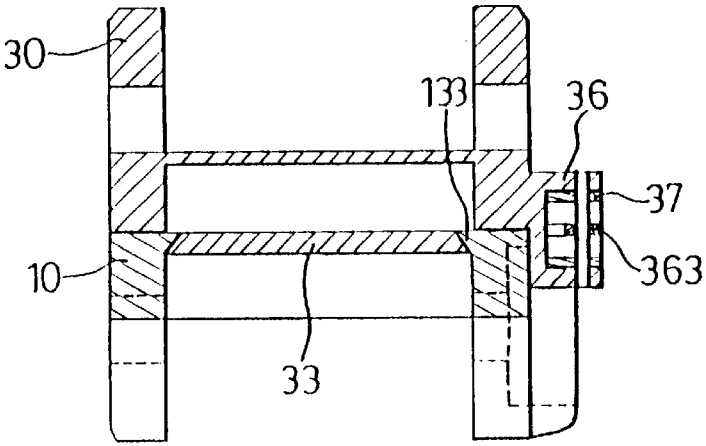
FIG. 5 is *a* cross sectional view taken along lines 5—5 of FIG. 3.

As shown in FIG. 2, the second tool assembly includes a block 30 having a pair of ears 31, 32 extended therefrom. The ears 31, 32 each includes a hole 311, 321 formed therein for engaging with a bolt 35. The block 30 includes a dovetail 33 formed therein for engaging with the dovetail slot 133 of the body 10 of the first tool assembly (FIG. 5) such that the first tool assembly and the second tool assembly may be secured together so as to form the tool combination. The block 30 includes a spanner 331 for engaging with the bicycle tire and for repairing the bicycle tire. The block 30 includes a housing 36 formed on one side portion and having a pin 362 (FIGS. 2, 3 and 6) pivotably secured therein. The pin 362 has two ends engaged in the holes 361 formed in the housing 36. A knob 37 has a center hole 371 formed [therien] *therein* for engaging with the pin 362 such that the knob 37 is rotatable about the pin 362. The knob 37 includes a projection 372 (FIGS. 2 and 6) formed thereon for engaging with the rib 141 of the body 10. A spring 363 is engaged on the pin 362 and is engaged between the block 30 and the knob 37 for biasing the projection 372 of the knob 37 to engage with the rib 141 of the body 10, such that the first tool assembly and the second *tool* assembly may be secured together.

Figure 7:
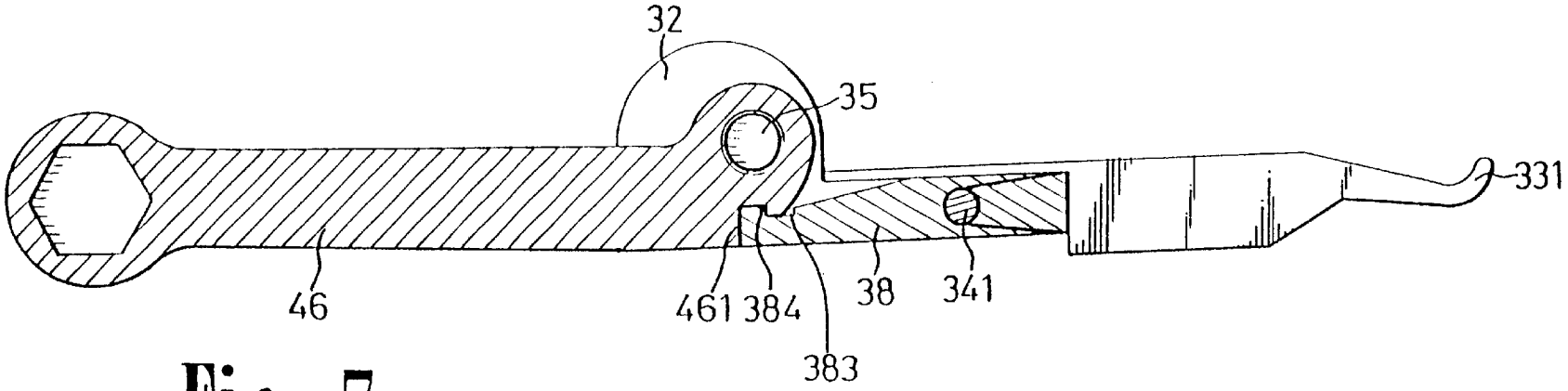
FIG. 7 is *a* cross sectional view taken along lines 7—7 of FIG. 3.

Referring next to FIG. 7 and again to FIG. 2, the block 30 includes two orifices 332 formed therein for engaging with a pole 34 therein. A catch 38 includes an aperture 381 formed therein for engaging with the pole 34 such that the catch 38 is rotatable about the pole 34. The catch 38 includes a recess 382 formed therein for engaging with a spring 341. The catch 38 includes a groove 383 and a flange 384 formed therein. The spring 341 is engaged on the pole 34 and is engaged between the block 30 and the catch 38 for biasing the groove 383 and the flange 384 upward toward the ears 311, 321. A number of wrenches 46, 47, 48 and a screw driver 49 and a beam 40 are rotatably engaged on the bolt 35. The beam 40 includes a notch 42 formed therein for engaging with two screw drivers 44, 45 therein which are rotatably engaged on the bolt 35 so as to form the second tool assembly. A bolt 43 is threadedly engaged with the inner thread [44] *440* of the beam 40 so as to form a typical tool for engaging with and for repairing chains of bicycles. The screw driver 49 includes two notches 492, 493 formed therein for engaging with and for repairing typical spokes. The wrenches 46, 47, 48 and the screw driver 49 each includes a cavity 461, 471, 481, 494 formed therein for engaging with the flange 384 of the catch 38. The spring 341 may bias the catch 38 for biasing the groove 383 and the flange 384 upward to engage with the cavities 461, 471, 481, 494 of the wrenches 46, 47, 48 and the screw driver 49, best shown in FIG.7, such that the wrenches 46, 47, 48 and the screw driver 49 may be retained in the opened or working position.

Accordingly, the tool combination in accordance with the present invention includes all of the required tools for fixing and repairing the bicycle. The tools are secured in two tool assemblies that may be secured together such that the tool combination can be easily stored and carried.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool combination comprising:

first tool assembly including a body having a dovetail slot formed therein and having a first bolt secured therein, at least one first tool rotatably engaged on said first bolt, a second tool assembly including a block having a dovetail formed thereon for engaging with said dovetail slot of said first tool assembly so as to secure said first tool assembly and said second tool assembly together, said block including a second bolt secured therein,

*a chain repairing tool rotatably engaged on said second bolt, said chain repairing tool including a notch formed therein,* at least one second tool rotatably engaged on said second bolt, and means for securing said first tool assembly and said second tool assembly together.

2. A tool combination according to claim 1, wherein said body includes a pair of ears formed thereon, said ears each includes a hole formed therein for engaging with said first bolt, a first of said ears includes a socket formed thereon.

3. A tool combination [according to claim 1] *comprising*:

*first tool assembly including a body having a dovetail slot formed therein and having a first bolt secured therein,*

*at least one first tool rotatably engaged on said first bolt,*

*a second tool assembly including a block having a dovetail formed thereon for engaging with said dovetail slot of said first tool assembly so as to secure said first tool assembly and said second tool assembly together, said block including a second bolt secured therein,*

*at least one second tool rotatably engaged on said second bolt, and*

*means for securing said first tool assembly and said second tool assembly together;* wherein said body includes a cap formed thereon and having a rib formed in said cap, said block includes a housing formed thereon, said securing means includes a knob pivotally engaged in said housing, said knob includes a projection formed thereon for engaging with said rib of said cap, said securing means includes a biasing means for biasing said projection of said knob to engage with said rib so as to secure said body to said block.

4. A tool combination according to claim 1, wherein said body includes a spanner for engaging with and for repairing bicycle tire.

5. A tool combination according to claim 1, wherein said block includes a spanner for engaging with and for repairing *a* bicycle tire.

6. A tool combination according to claim 1, wherein said second tool each includes a cavity formed therein, said second tool assembly includes a pole secured therein, a catch includes a middle portion pivotally coupled to said pole and rotatable about said pole, said catch includes a flange formed thereon for engaging with said cavity of said second tool so as to position said second tool, said catch includes a biasing means for biasing said flange to engage with said cavity.

7. A tool combination according to claim 1 further comprising [a chain repairing tool rotatably engaged on said second bolt, said chain repairing tool including a notch formed therein, and] at least one third tool engaged in said notch of said chain repairing tool and rotatably engaged on said second bolt.

*8. A tool combination comprising, in combination:*

*a first tool assembly including a body having a slot formed therein and having a first bolt secured therein, said first bolt having an axial extent,*

*at least one first tool rotatably engaged on said first bolt,*

*a second tool assembly including a block having a member formed thereon for engaging with said slot of said first tool assembly, said block including a second bolt secured therein, said second bolt having an axial extent, and*

*at least one second tool rotatably engaged on said second bolt, with the member being engaged with the slot when the first and second tool assemblies are secured together to form the tool combination with the first tool being within the axial extent of the second bolt and the second tool being within the axial extent of the first bolt.*

*9. A tool combination according to claim 8, wherein the slot is a dovetail slot and the member is a dovetail.*

*10. A tool combination according to claim 8, further comprising, in combination: means for securing said first tool assembly and said second tool assembly together.*

*11. A tool combination according to claim 8, wherein said body includes a pair of ears formed thereon, said ears each*

*includes a hole formed therein for engaging with said first bolt, a first of said ears includes a socket formed thereon.*

*12. A tool combination according to claim 8, wherein said body includes an extension portion which has a curved terminal end section and which forms a spanner for engaging with and breaking a bead between a tire and a rim for repairing a bicycle tire.*

*13. A tool combination according to claim 12, wherein said body includes an extension portion which has a curved terminal end section and which forms a spanner for engaging with and breaking the bead between the tire and the rim for repairing the bicycle tire.*

*14. A tool combination comprising, in combination:*

*a first tool assembly including a body having a slot formed therein and having a first bolt secured therein,*

*at least one first tool rotatably engaged on said first bolt,*

*a second tool assembly including a block having a member formed thereon for engaging with said slot of said first tool assembly, said block including a second bolt secured therein,*

*at least one second tool rotatably engaged on said second bolt, with the member being engaged with the slot when the first and second tool assemblies are secured together to form the tool combination, and*

*a beam rotatably engaged on said second bolt and including an inner thread; and a bolt threadably engaged with the inner thread of the beam to form a chain repairing tool.*

*15. A tool combination comprising, in combination:*

*a first tool assembly including at least one, rotatably mounted first tool;*

*a second tool assembly including at least one, rotatably mounted second tool; and*

*means for engaging the first tool assembly with the second tool assembly such that the first tool assembly and the second tool assembly may be secured together so as to form the tool combination with the first and second tool assemblies being attachable along a first plane and each of the first and second tools being rotatable in a second plane which is substantially perpendicular to the first plane.*

*16. A tool combination according to claim 15, further comprising, in combination: means for securing the first tool assembly and the second tool assembly together.*

*17. A tool combination according to claim 15, wherein the first tool assembly includes a body and the second tool assembly includes a block, and wherein the engaging means comprises a slot formed in the body and a member formed in the block for engaging with the slot.*

*18. A tool combination according to claim 15, wherein the first tool assembly includes a body and the second tool assembly includes a block, and wherein the body includes a first bolt secured thereto to which said at least one, rotatably mounted first tool is rotatably mounted, and the block includes a second bolt secured thereto to which said at least one, rotatably mounted second tool is rotatably mounted thereto.*

*19. A tool combination according to claim 18, wherein said body includes a pair of ears formed thereon, said ears each includes a hole formed therein for engaging with said first bolt, a first of said ears includes a socket formed thereon.*

*20. A tool combination according to claim 15, wherein the first tool assembly includes a body; and wherein said body includes an extension portion which has a curved terminal end section and which forms a spanner for engaging with and breaking a bead between a tire and a rim for repairing a bicycle tire.*

*21. A tool combination according to claim 20, wherein the second tool assembly includes a block; and wherein said block includes an extension portion which has a curved terminal end section and which forms a spanner for engaging with and breaking the bead between the tire and the rim for repairing the bicycle tire.*

*22. A tool combination comprising, in combination:*

*a first tool assembly including at least one, rotatably mounted first tool;*

*a second tool assembly including at least one, rotatably mounted second tool; and*

*means for engaging the first tool assembly with the second tool assembly such that the first tool assembly and the second tool assembly may be secured together so as to form the tool combination, wherein the second tool comprises, in combination: a beam including an inner thread; and a bolt threadably engaged with the inner thread of the beam to form a chain repairing tool.*

* * * * *